Jan. 25, 1966  W. F. WUOTILA  3,230,658
FISH LURE
Filed May 7, 1964
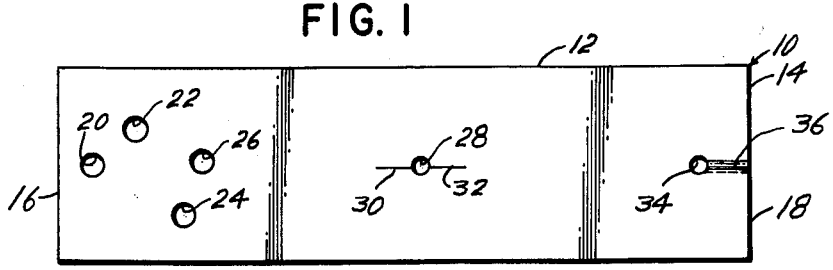
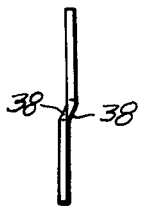
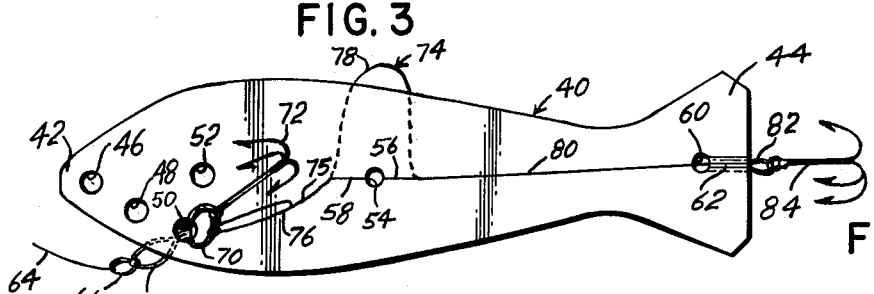
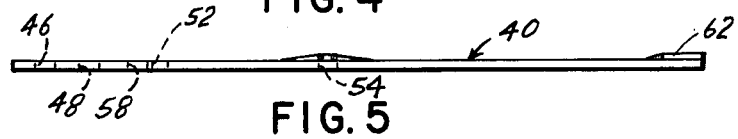
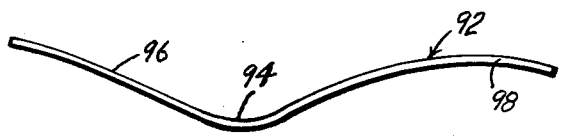
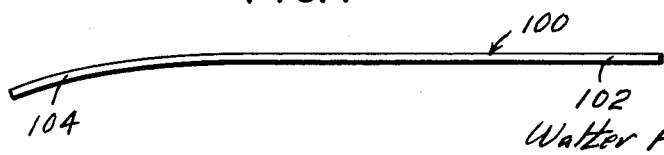
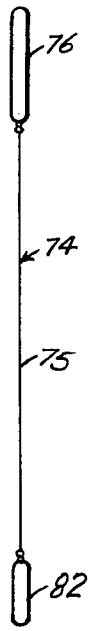
INVENTOR.
Walter F. Wuotila
BY
TW Secrest
ATTORNEY 
3,230,658
FISH LURE
Walter F. Wuotila, 5437 25th SW., Seattle, Wash.
Filed May 7, 1964, Ser. No. 365,692
4 Claims. (Cl. 43—42.23)

This invention is for a fish lure.

An object of this invention is to provide a fish lure which may have many different motions with only a small change in the placing of the leader in the lure; a fish lure which has means for controlling a rear hook attached to the lure; a fish lure whereby it is possible to change the shape of the lure by means of a moderate degree of heat and by a moderate degree of cooling; a fish lure of such a construction that it is easy to dismantle the line with the hooks from the lure and, also, to assemble the line with the hooks on the lure; a fish lure which is inexpensive to manufacture; a lure which occupies a small volume and, therefore, a relatively large number may be stored in a small space; a lure which can easily be made in many different sizes and shapes; a lure which is light in weight and rides above the sinker level of the sinkers associated with the lure; a lure which is of a soft material so that the fish will strike and strike again; a lure which will not corrode; a lure which is lighter in weight than water and, therefore, will float; a lure which may be used for casting, trolling and stop-and-go trolling; and, a lure which can accommodate a different number of hooks.

These and other important objects and advantages of the invention will be more particularly brought out upon reference to the drawings, a detailed description of the invention and the appended claims.

In the drawings:

FIGURE 1 is a view of a rectangular shaped fish lure;

FIGURE 2 is an end view of the trailing edge of the rectangular shaped fish lure;

FIGURE 3 is a specific embodiment of a fish lure constructed in accordance with the preferred teachings of the invention and illustrates the fish lure as having the silhouette of a fish;

FIGURE 4 is an edge view of a fish lure in a flat position;

FIGURE 5 is an edge view of a fish lure with a wide curve or having a large radius or bend;

FIGURE 6 is an edge view of a fish lure and shows the lure as having a reverse curve;

FIGURE 7 is an edge view of a fish lure which shows a slight curve at the front of the lure; and, FIGURE 8 is a view of the leader associated with the fish lure.

In FIGURE 1 there is illustrated a fish lure 10 having a body portion in the general configuration of a rectangle having a length 12 and a width 14. At the front of the fish lure 10 there is a leading edge 16, and at the rear of the fish lure 10 there is a trailing edge 18. Near the leading edge 16 there are a multiplicity of openings or eyes, viz., 20, 22, 24 and 26. These eyes are spaced at different distances from the leading edge 16 and, also, at different distances from the longitudinal axis of the fish lure 10.

Near the central part of the fish lure 10 there is an eye 28. In the body of the fish lure 10 there are two slots 30 and 32. These two slots connect with the eye 28. Near the trailing edge 18 of the fish lure 10, there is an eye 34. A slot 36 connects the eye 34 with the trailing edge 18. In FIGURE 2 it is seen that the slot 36 is cut at a bias 38, approximately at an angle of forth-five (45°) degrees. In this manner it is possible for the body of the fish lure 10 to overlie itself to form a locking means or a catch.

In FIGURE 3 there is illustrated a fish lure 40 having a general configuration of a silhouette of a fish. The fish lure 40 has a head portion or a leading edge portion 42 and a tail or trailing edge portion 44. In the leading edge or head portion 42 there are four eyes, viz., 46, 48, 50 and 52. These eyes are spaced at different distances from the leading edge and, also, at different distances from the longitudinal axis of the fish lure 10.

In the main body portion 40 and in approximately the middle part thereof, there is an eye 54. In the body portion there are two slots 56 and 58. These two slots connect with the eye 54. In the trailing edge portion 44 there is an eye 60. A slot 62 connects the eye 60 with the trailing edge of the trail 44. Again, the body portion which is adjacent the slot 62 is cut at a bias so that the bory portion will overlie itself to form a lock.

The fishhooks are arranged with respect to the fish lure 40 as illustrated. There is a leader 64 which terminates in an eye 66. The eye 66 connects with the swivel 68. The swivel 68 connects with a split ring 70. In FIGURE 3 it is seen that the swivel 68 is on one side of the body of the fish lure and the split ring 70 is on the other side of the body of the fish lure. On the split ring there may be a multiple hook 72. The split ring 70 connects with a loop 76 of the leader 74. Part of the leader 74, identified by reference numeral 75, passes through the slot 58.

The leader 74, after passing through the slot 58, forms a loop. 78 This leader 74 then passes through the slot 56 into that portion 80. Portion 80 passes through the eye 60. That portion 80 of the leader 74 terminates in a loop 82. The loop 82 connects with a fishhook 84 having a multiplicity of barbs.

In FIGURE 5 there is illustrated an edge view of the lure 40. It is seen in this figure that the lure is thin. Actually, the area of the lure is many times the thickness of the lure. The lure may have a thickness of approximately 0.030–0.040 inch. The approximate outside dimensions, rectangularly speaking, from one-half inch by one inch (½″ x 1″) to approximately two inches by six inches (2″ x 6″). It is to be realized that the outside dimensions may be much greater than indicated; although, for most fishing purposes, the dimensions given will cover the vast majority of lures. Also, from FIGURES 1 and 3 it is seen that lures may take substantially any number of shapes. In FIGURE 1 the shape of the lure is rectangular while in FIGURE 3, the shape of the lure is a silhouette of a fish. From an operational standpoint, the fish lure in FIGURE 1 probably functions just as well as the fish lure of FIGURE 3.

From having fished with these lures, I can state that placing the swivel 68 and the split ring 70 in the eye 20 of the lure 10 or in the eye 46 of the lure 40, there is imparted a short side-to-side motion to the fish lure or a short swinging action; in the eye 22 of the lure 10 or the eye 48 of the lure 40, there is imparted a short spinning action to the lure; in the eye 24 of the lure 10 or the eye 50 of the lure 40, there is imported a wider and more vigorous spinning motion; and, in the eye 26 of the lure 10 or in the eye 52 of the lure 40, there is imparted a wide side-to-side motion.

The eye 28 and the slots 30 and 32 of the lure 10, and the eye 54 and the slots 56 and 58 of the lure 40 make it possible to adjust the leader and, also, the position of the hook 84.

The fish lure 10 and the fish lure 40 may be made of a suitable material such as polyethylene in the sheet form or polypropylene in the sheet form. The specific gravity, with respect to water, of the polyethylene varies from 0.91 to 0.965 and the specific gravity of the polypropylene varies from 0.900 to 0.915. It is seen that in both instances, the fish lure has a specific gravity less than water and, therefore, will tend to float. With the use of sinkers and fishhooks, the fish lure will be above the sinker and the fishhook will be in the water.

When polypropylene is used, it is possible to vary the configuration of the fish lure by gently heating the fish lure on an exhaust pipe, heating by means of a match, heating by placing the lure next to a person's body, for example: holding it in that postion for a short period of time until the lure softens. Upon the softening of the lure or the polypropylene of the lure, the lure can be shaped to a desired configuration and, then, placed in a cold material such as the cold water in a stream to thermoplastically set the polypropylene. Examples of configurations are shown in FIGURE 5 where the lure, in an edge view, has a large radius of curvature or makes a gentle curve. In FIGURE 6, in an edge view, there is illustrated another odd configuration of the fish lure. In this particular lure 92 it is seen that the lure has a curved portion 94 which is an inverse curve, and two gentle curved portions 96 and 98 which connect with the curved portion 94. In FIGURE 7 there is illustrated, in edge view, another fish lure 100 having a long flat portion or straight portion 102 and a gentle curved tip 104. Naturally, the lures 40, 90, 92 and 100 due to their various configurations, will have different motions in the water.

In FIGURE 8 it is seen that the leader 74 has a loop 76 at one end, approximately one inch long and a loop 82 at the other end, approximately one-half inch in length. The purpose of the loop 76 is to anchor down hook 72 to the body of the lure, if so desired by the fisherman.

From the foregoing it is seen that I have provided a lure which is easy to manufacture, which may be adjusted while fishing to have a different configuration by merely heating and cooling the lure and which lure is capable of having a multiplicity of movements or motions in the water as there are a multiplicity of openings through which a leader and associated fishing gear may be attached or positioned. Further, this lure, as it is very thin compared with its area, does not occupy a great volume; and, therefore, many lures may be stored in a small space. Further, the leader, associated fishing gear and hooks may be attached to the fish lure in a short period of time and, also, may be readily removed from the fish lure.

What I claim is:
1. A fish lure, said lure comprising:
 (a) a body portion;
 (b) said body portion having a longitudinal dimension greater than a lateral dimension;
 (c) said body portion having an area many times the thickness of the body portion;
 (d) said body portion having a leading edge and a trailing edge;
 (e) three eyes in the body portion juxtapositioned to the leading edge;
 (f) said eyes being spaced different distances from the leading edge and also different distances from the longitudinal axis of the body portion;
 (g) a fourth eye in the body portion in the vicinity of said three eyes;
 (h) a fifth eye adjacent said trailing edge;
 (i) a slot in the body portion leading from the fifth eye to the trailing edge;
 (j) said slot being on a bias with respect to the body portion so that the body portion overlaps itself;
 (k) a sixth eye in approximately the middle part of the body portion;
 (l) two slots in the body portion connecting with the sixth eye; and,
 (m) each of the said two slots being on opposite sides of the sixth eye and extending substantially longitudinally of the body portion.

2. A fish lure, said lure comprising:
 (a) a body portion;
 (b) said body portion having a longitudinal dimension greater than a lateral dimension;
 (c) said body portion having an area many times the thickness of the body portion;
 (d) said body portion having a leading edge and a trailing edge;
 (e) three eyes in the body portion juxtapositioned to the leading edge;
 (f) said eyes being spaced different distances from the leading edge and also different distances from the longitudinal axis of the body portion;
 (g) a fourth eye in the body portion in the vicinity of said three eyes;
 (h) a fifth eye adjacent said trailing edge;
 (i) a first slot in the body portion leading from the fifth eye to the trailing edge;
 (j) said first slot being at a bias with respect to the body portion so that the body portion overlaps itself;
 (k) a sixth eye in approximately the middle part of the body portion;
 (l) a second slot and a third slot in the body portion connecting with the sixth eye;
 (m) said second and third slots being on opposite sides of the sixth eye and extending substantially longitudinally of the body portion; and,
 (n) a leader having a first part in the second slot and a second part in the third slot.

3. A fish lure, said lure comprising:
 (a) a body portion;
 (b) said body portion having an area many times the thickness of the body portion;
 (c) said body portion having a leading edge and a trailing edge;
 (d) three eyes in the body portion juxtapositioned to the leading edge;
 (e) said eyes being spaced different distances from the leading edge and also different distances from a longitudinal axis of the body portion;
 (f) a fourth eye in the body portion in the vicinity of said three eyes;
 (g) a fifth eye adjacent said trailing edge;
 (h) a sixth eye in approximately the middle part of the body portion;
 (i) a first slot and a second slot in the body portion connecting with the sixth eye;
 (j) said first and second slots being on opposite sides of the sixth eye and extending substantially longitudinally of the body portion;
 (k) a leader having a first part in the first slot and a second part in the second slot;
 (l) said second part of the leader extending toward the trailing edge and passing through the fifth eye;
 (m) said first part of the leader extending toward the leading edge and connecting with a first keeper;
 (n) said first keeper connecting with a second keeper; and,
 (o) said first and second keepers being on opposite sides of the body portion and connecting through one of the first four eyes.

4. A fish lure, said lure comprising:
 (a) a body portion of a flexible material which may be readily folded back on itself;
 (b) said body portion having an area many times the thickness of the body portion;
 (c) said body portion having a leading edge and a trailing edge;
 (d) three eyes in the body portion juxtapositioned to the leading edge;
 (e) said eyes being spaced different distances from the leading edge and also different distances from a longitudinal axis of the body portion;

(f) a fourth eye in the body portion in the vicinity of said three eyes;
(g) a fifth eye adjacent said trailing edge;
(h) a sixth eye in approximately the middle part of the body portion;
(i) a first slot and a second slot in the body portion connecting with the sixth eye;
(j) said first and second slots being on opposite sides of the sixth eye and extending substantially longitudinally of the body portion;
(k) a leader having a first part in the first slot and a second part in the second slot;
(l) said second part of the leader extending toward the trailing edge and passing through the fifth eye and connecting with a first fishhook;
(m) said first part of the leader extending toward the leading edge connecting with a split ring;
(n) said split ring connecting with a swivel;
(o) said split ring and said swivel connecting through one of the four eyes; and,
(p) said split ring and said swivel being on opposite sides of the body portion.

References Cited by the Examiner

UNITED STATES PATENTS

| | | | |
|---|---|---|---|
| 2,214,266 | 9/1940 | Haury | 43—42.52 |
| 2,514,938 | 7/1950 | Craig | 43—42.5 X |
| 2,634,539 | 4/1953 | Brown et al. | 43—17.2 |
| 2,705,848 | 4/1955 | Steltner | 43—42.52 X |
| 2,861,381 | 11/1958 | Snyder | 43—42.5 X |

FOREIGN PATENTS 958,469  9/1949  France.

SAMUEL KOREN, *Primary Examiner.*
RAYMOND L. HOLLISTER, *Assistant Examiner.*